(12) United States Patent
Durai et al.

(10) Patent No.: US 10,063,329 B2
(45) Date of Patent: Aug. 28, 2018

(54) MEASURING DEVICE AND MEASURING METHOD USING BROADCAST MEASURING SIGNALS

(71) Applicant: Rohde & Schwarz Asia Pte. Ltd, Singapore (SG)

(72) Inventors: Rajashekar Durai, Singapore (SG); Gerson Bacor, Singapore (SG); Vinzenz Dallabetta, Olching (DE)

(73) Assignee: Rohde & Schwarz Asia Pte. Ltd, Singapore (SG)

( * ) Notice: Subject to any disclaimer, the term of this patent is extended or adjusted under 35 U.S.C. 154(b) by 260 days.

(21) Appl. No.: 14/635,551

(22) Filed: Mar. 2, 2015

(65) Prior Publication Data
US 2016/0261356 A1 Sep. 8, 2016

(51) Int. Cl.
*G06F 11/00* (2006.01)
*H04B 17/309* (2015.01)
*H04B 17/00* (2015.01)
*H04B 17/14* (2015.01)

(52) U.S. Cl.
CPC ....... *H04B 17/309* (2015.01); *H04B 17/0085* (2013.01); *H04B 17/14* (2015.01)

(58) Field of Classification Search
CPC .................................................. H04B 17/309
USPC ........................................................ 370/252
See application file for complete search history.

(56) References Cited

U.S. PATENT DOCUMENTS

| | | | |
|---|---|---|---|
| 8,000,656 B1* | 8/2011 | Jiao | H04B 17/0085 455/423 |
| 2008/0151763 A1* | 6/2008 | Lee | H04L 43/50 370/241 |
| 2011/0270561 A1* | 11/2011 | Gregg | G01R 35/005 702/82 |
| 2012/0231744 A1* | 9/2012 | Gregg | H04B 17/309 455/67.12 |
| 2013/0148524 A1* | 6/2013 | Holzmann | G01R 1/206 370/252 |
| 2013/0294252 A1* | 11/2013 | Olgaard | H04L 43/12 370/241 |
| 2014/0016483 A1* | 1/2014 | Patel | H04L 43/50 370/252 |
| 2014/0269871 A1* | 9/2014 | Huynh | H04B 1/38 375/224 |
| 2016/0072594 A1* | 3/2016 | Yuan | H04B 17/16 455/424 |

OTHER PUBLICATIONS

Anritsu, MT8860C WLAN Test Set, 2013, pp. 1-pp. 7.

* cited by examiner

*Primary Examiner* — Christopher R Crompton
(74) *Attorney, Agent, or Firm* — Lee & Hayes, PLLC

(57) ABSTRACT

A measuring device comprises a transmission unit and a communication unit. The transmission unit is adapted to transmit a measuring signal, being an analog high frequency broadcast signal to at least one device under test. The communication unit is adapted directly receive at least one measuring result from the at least one device under test.

19 Claims, 5 Drawing Sheets

MEASURING DEVICE AND MEASURING METHOD USING BROADCAST MEASURING SIGNALS

TECHNICAL FIELD

The invention relates to transmitting measuring signals to devices under test and determining the quality of signal reception by the respective device under test.

BACKGROUND ART

The increase of internet usage has brought a continued surge in data traffic and congestion in the network. Most of the internet users use mobile devices rather than personal computers due to the enhanced mobility and ease of use. However, mobile devices are limited to transport internet data through wireless connections. Since mobile traffic data is transmitted wirelessly, the performance of a mobile phone's wireless connectivity is of great importance. A number of different methods to benchmark the quality of wireless communication chip sets are known. Especially, a packet error rate (PER) measurement is often used. In packet error rate measurement, the mobile devices are tested with different settings, such as transmit power, modulation coding rates, and receiver sensitivities. This results in a complex measurement and requires a long test duration. This is explained in greater detail with reference to FIG. 1 and FIG. 2.

For a great number of wireless communication standards, unicast, multicast and broadcast type transmissions are known. In unicast, a respective device, either a station or an access point, receives frames of data. In case of a successful reception, an acknowledgment is sent back to the sender. The sender therefore has to wait with transmitting a further frame packet until it has received the acknowledgment or decided that the acknowledgment will not arrive. In this case, the same frame is retransmitted.

While a unicast frame is used in one-to-one communication, multicast is used to send data to multiple stations within the communication network. A correctly received multicast frame is not acknowledged so as to limit protocol over head. On the other hand, a broadcast frame is almost similar to a multicast frame, but it is sent to all stations with the communication network. In both cases, multicast and broadcast, an acknowledgment is not sent. Therefore, the transmitting device can send consecutive data frames without having to wait for acknowledgment frames in between.

For measuring purposes though, mainly unicast signals have been used in the past. This is very time inefficient, since the above-mentioned waiting period is necessary after each single data frame has been transmitted. The acknowledgment time delays lead to a very long overall measuring time.

The document "Anritsu, MT8860C WLAN Test Set" shows a measuring setup for measuring the reception performance of a WLAN stick. A measuring device generates a broadcast measuring signal and transmits it wirelessly to the device under test. The device under test determines the packet error rate of the received measuring signal and hands this measuring result to a measuring PC. The measuring PC also can be used for controlling the measuring device.

This measuring system is disadvantageous, since it requires an additional measuring PC for receiving the measuring result from the device under test. This leads to a high hardware effort. Moreover, the additional communication between the measuring PC and the measuring device leads to an increased measuring time.

Accordingly, one object of the invention is to provide a measuring device and a measuring method, which achieve a low measuring time while requiring only a low hardware effort.

SUMMARY OF THE INVENTION

According to one aspect of the invention a measuring device comprises a transmission unit and a communication unit. The transmission unit is adapted to transmit a measuring signal, being an analog high frequency broadcast signal to at least one device under test. The communication unit is adapted to directly receive at least one measuring result from the at least one device under test. It is thereby possible to perform the measurement using only the measuring device.

Advantageously, the transmission unit is adapted to transmit the measuring signal wirelessly or over a wired connection, especially a USB connection to the at least one device under test. Additionally or alternatively, the communication unit is adapted to receive the at least one measuring result from the at least one device under test wirelessly or over a wired connection, especially a USB connection. A high measuring flexibility can thereby be achieved.

Advantageously, the at least one measuring result comprises a packet error rate and/or a bit error rate and/or a signal-two-noise-ratio. A further increase in measuring flexibility is thereby achieved.

In a further advantageous embodiment, the measuring device is adapted to require no additional hardware for performing the measurement. The measuring device is advantageously adapted to transmit the measuring signal to the at least one device under test and to receive the at least one measuring result from the at least one device under test without assistance of any external control device. A great reduction in hardware complexity is thereby achieved.

Advantageously, the measuring device comprises a display unit adapted to display the at least one measuring result. Additionally or alternatively, the measuring device comprises a processing unit adapted to control the transmission unit and/or the communication unit and/or the display unit, if the measuring device comprises a display unit. A very efficient measuring device construction is thereby possible.

Advantageously, the measuring signal is a LTE-signal and the at least one device under test is an LTE-device. Alternatively, the measuring signal is a WIMAX signal and the at least one device under test is a signal is a WIMAX device. Alternatively, the measuring signal is a WLAN signal and the at least one device under test is a WLAN device. Alternatively, the measuring signal is a UMTS-signal and the at least one device under test is a UMTS-device. A great measuring flexibility is thereby achieved.

Advantageously, the transmission unit is adapted to transmit the measuring signal to a plurality of devices under test simultaneously. The communication unit is then adapted to receive simultaneously from the plurality of devices under test each at least one measuring result. A very efficient measurement is thereby possible.

According to another aspect of the invention a measuring system comprises a before-described measuring device and at least one device under test. The at least one device under test comprises a reception unit adapted to receive the measuring signal and a measuring result determining unit adapted to determine the at least one measuring result. For example this is done by comparing the received measuring signal with pre-stored information. Moreover, the device under test comprises a communication unit adapted to transmit the at least one measuring result to the measuring device.

According to still another aspect of the invention a measuring system comprises an earlier-described measuring device and a plurality of devices under test. The plurality of devices under test each comprise a reception unit adapted to receive the measuring signal, a measuring result determining unit adapted to determine the at least one measuring result, and a communication unit adapted to transmit the at least one measuring result to the measuring device.

Advantageously, the device under test is adapted to run a measuring software, which is adapted to control the measuring result determining unit to determine the at least one measuring result, and/or to control the communication unit to transmit the at least one measuring result to the measuring device. A very high measuring flexibility with a low measuring time and a low hardware effort can thereby be achieved.

According to another aspect of the invention a measuring method comprises transmitting an analog high frequency broadcast measuring signal to at least one device under test by a measuring device, receiving the measuring signal by the at least one device under test, determining at least one measuring result, transmitting the at least one measuring result directly to the measuring device, and receiving the at least one measuring result directly from the at least one device under test by the measuring device. A low hardware complexity and a low measuring time thereby can be achieved.

BRIEF DESCRIPTION OF THE DRAWINGS

Exemplary embodiments of the invention is not further explained by way of example only with respect to the drawings, in which.

DETAILED DESCRIPTION OF THE PREFERRED EMBODIMENTS

Figure 1:
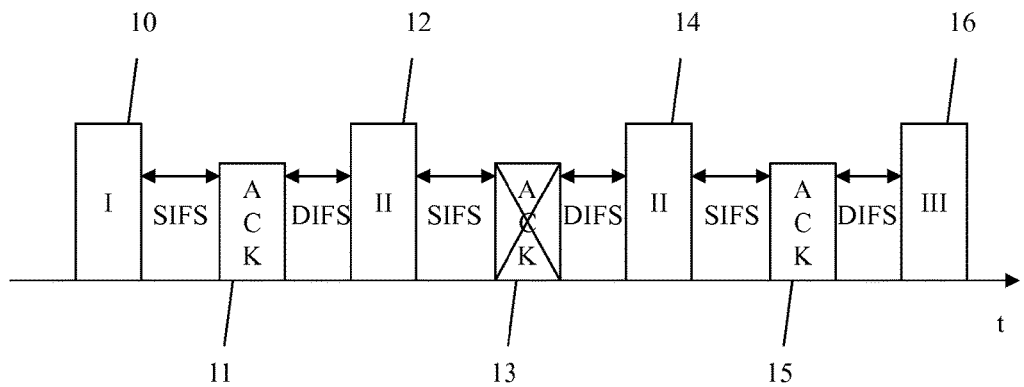
FIG. 1 shows an exemplary communication structure.
Figure 2:
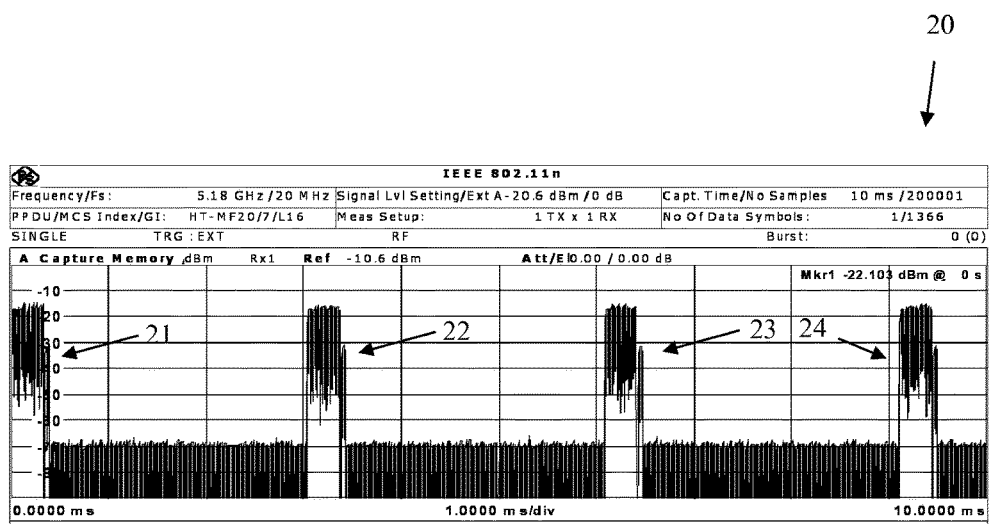
FIG. 2 shows display contents of a measuring device measuring exemplary data packet.

First, we demonstrate the function and disadvantages of using unicast signals for measurement purposes along FIG. 1 and FIG. 2. Along FIG. 3, an embodiment of the inventive measurement system and device is explained. Along FIGS. 4-6, the advantages of the present invention are described. Finally, along FIG. 7, the function on an embodiment of the inventive measuring method is shown. Similar entities and reference numbers and different figures have been partially omitted.

Reference will now be made in detail to the preferred embodiments of the present invention, examples of which are illustrated in the accompanying drawings. However, the following embodiments of the present invention may be variously modified and the range of the present invention is not limited by the following embodiments.

In FIG. 1, an exemplary communication using unicast is shown. A first packet 10 is transmitted. Afterwards, a short inter frame space (SIFS) time is waited, until the receiver of the first packet 10 acknowledges the packet 10 with an acknowledge message 11. Thereafter, a distributed coordination function inter frame spacing (DIFS) is waited, until a second frame 12 is transmitted. After waiting a further SIFS period, no acknowledge frame is transmitted, since the second packet 12 was not correctly received, in this example. Still, another DIFS period has to be waited, until the second packet can be retransmitted as packet 14. After waiting another SIFS period, an acknowledgment packet 15 is transmitted. After waiting another DIFS period, a third packet 16 is transmitted. As can clearly be seen, only small parts of the available time are used for actually transmitting the data packets, which are necessary for performing the measurements, and long periods are used for necessary waiting times and acknowledgment packets.

This is also illustrated along FIG. 2, in which a measurement device readout 20 is shown, indicating the data packets 21, 22, 23 and 24 and the waiting time therebetween. Here, the acknowledgment packets are not depicted.

For determining the packet error rate, the number of packets in total and the number of lost packets is necessary. The packet error rate is determined as follows:

$$PER = \frac{\text{lost packet}}{\text{sent packet}} [\%]$$

Therefore, the conventional method for determining the packet error rate is to send a unicast packet from an access point to a device under test. As already shown along FIG. 1, it is necessary that this packet is acknowledged in order to determine, if the packet was successfully received. The packet error rate is then calculated in the access point, or in this case in the measuring device by counting the number of acknowledgment packets and dividing it by the number of unicast frame set.

A disadvantage of the existing packet error rate measurement method is that it is very time inefficient. The access point, here the measuring device has to wait for the acknowledgment frame before it can send the next packet. These acknowledgment time delays include the short inter frame space (SIFS) time and the distributed coordination function inter frame spacing (DIFS) and the acknowledgment transmission time. These delays are a significant factor in the packet error rate measurement time, when the requirement is to send large numbers of packets.

Figure 3:
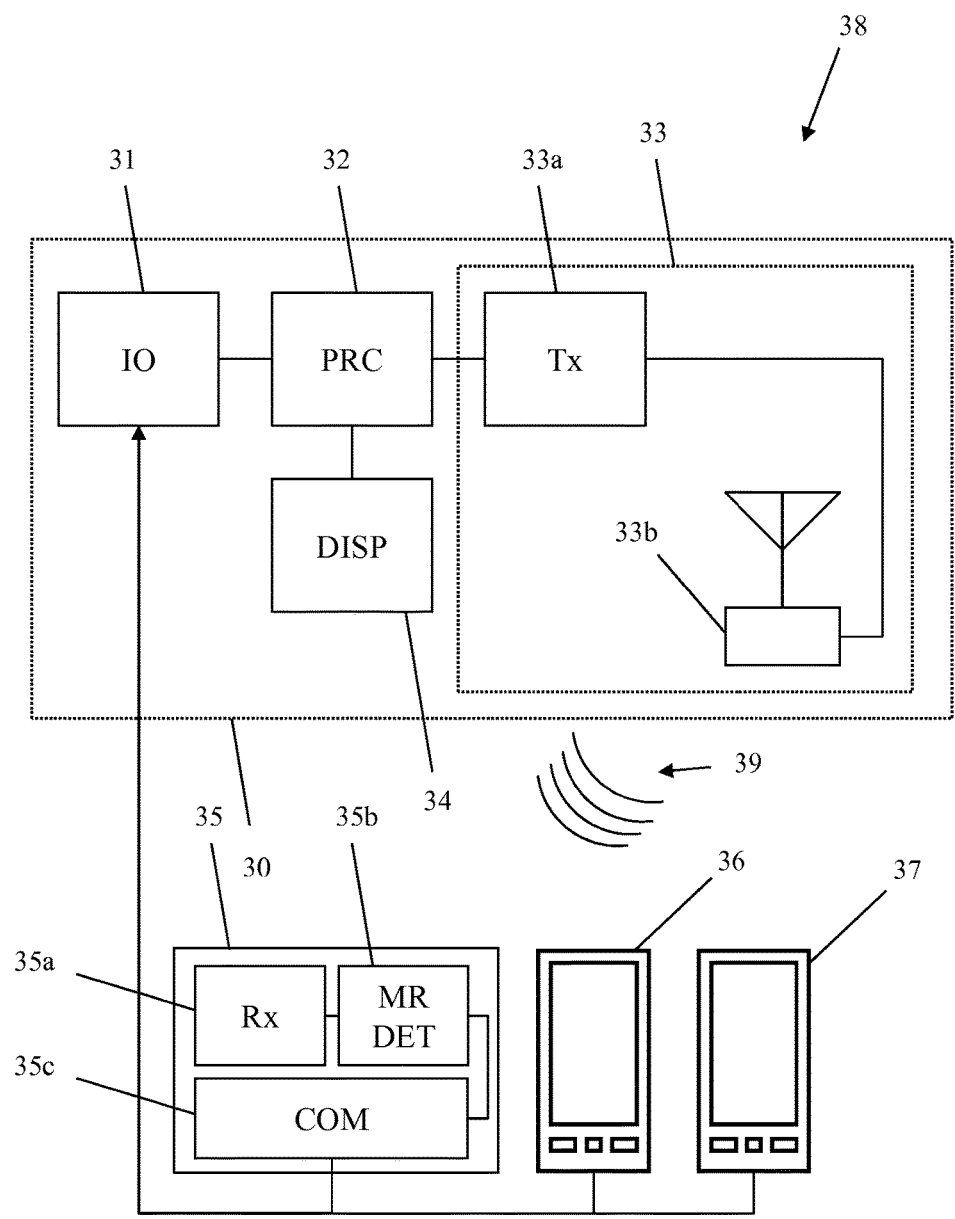
FIG. 3 shows an embodiment of the inventive measuring system and device.

In FIG. 3, an embodiment of the inventive measuring device 30 is shown. The measuring device 30 comprises a communication unit 31, which is connected to a processing unit 32, which again is connected to a transmission unit 33 and to a display unit 34. The transmission unit 33 comprises a transmitter 33a at an antenna 33b. The processing unit 32 is adapted to control the communication unit 31, the transmission unit 33 and the display unit 34.

The measuring device 30 is connected to the DUTs 35, 36, 37. Especially, the communication unit 31 is connected to the DUTs 35, 36, 37 over a wired connection. Moreover, the antenna 33b of the transmission unit 33 is connected to the devices under test 35, 36 and 37 wirelessly.

The devices under test 35, 36, 37 are in this example mobile phones. Other devices under test are also possible. The devices under test 35, 36 and 37 each comprise a reception unit 35a, a measuring result determining unit 35b and a communication unit 35c. The inner workings of the devices under test 35, 36 and 37 are only shown in regard to the device under test 35.

The measuring device 30 and the devices under test 35, 36 and 37 together form a measuring system 38.

When a measurement is performed, the processing unit 32 of the measuring device 30 triggers the transmission unit 33 to generate and transmit a measuring signal 39. Especially, the processing unit 32 triggers the transmitter 33a to generate the measuring signal 39, which is then handed to the antenna 33b, which transmits the measuring signal 39. The measuring signal 39 is an analog high frequency broadcast measuring signal. Especially, the measuring signal is a WLAN or LTE or WIMAX or UMTS or WCDMA signal.

The identical measuring signal 39 is then transmitted wirelessly to all devices under test 35, 36 and 37. Alternatively, the measuring signal 39 can also be transmitted over a wired connection, for example an coaxial connection. In this case, the antenna 33b is omitted. The measuring signal 39 is then received by the reception unit 35a of the devices under test 35, 36 and 37.

The received measuring signal 39 is handed on to the measuring result determining unit 35b, which determines a respective measuring result. For example, a packet error rate is determined. To do this, for example a cyclic redundancy check CRC is performed on the individually received packets. Also a comparison with pre-stored information is possible. Apart from determining a packet error rate, also a determining of a bit error rate or a signal-to-noise-ratio or any other form of measuring result is possible.

The determined measuring result or results are handed on to the communication unit 35c, which then transmits the measuring result to the measuring device 30, especially to the communication unit 31 of the measuring device 30. The measuring result is then handed on to the processing unit 32, which controls the display unit 34 to display the measuring result.

It is thereby possible to achieve a very efficient measurement, since an external control PC is not necessary.

Figure 4:
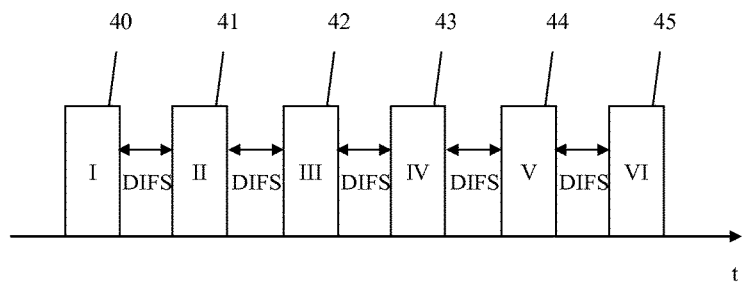
FIG. 4 shows a communication structure as used by an embodiment of the inventive measuring system device and method.

In FIG. 4, an exemplary communication using a broadcast signal is shown. Consecutive frames 40-45 are transmitted without waiting for acknowledgment packets. Between the frames, only a distributed coordination function inter frame spacing DIFS has to be waited. For reasons of visibility, the width of the, DIFS, period has been greatly exaggerated in comparison to the width of the frames 40-45. It is obvious that a far greater part of the available time is actually used for transmitting data packets, resulting in a significantly reduced measuring time in comparison to the unicast communication shown in FIG. 1 and FIG. 2.

Figure 5:
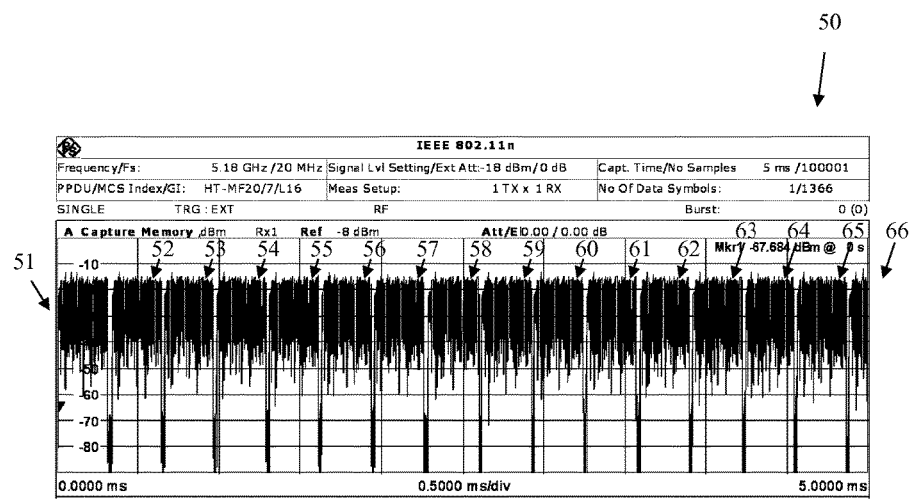
FIG. 5 shows an exemplary read out of a measuring device measuring transmission packets as used by embodiments of the inventive measuring system, device and method.

This is also further shown along FIG. 5. There, a measuring device readout 50 measuring the transmission of frames as shown in FIG. 4. Frames 51-66 are transmitted in close succession waiting only a very short DIFS period in between. Especially here, it is obvious that within the same measuring time, a far greater number of packets can be processed then as in the unicast example shown in FIG. 2. Therefore, the measuring time per packet is only the duration of the packet plus the DIFS period. Therefore, a time reduction per packet can be achieved as follows:

$$T_R = T_{SIFS} + T_{ACK}$$

The value of $T_{SIFS}$ is fixed depending on the communication standard. The value of $T_{ACK}$ is variable depending on the modulation rate of the ACK frame.

In order to support the above-shown measurement additional software is necessary on regular devices under test. Therefore, a measuring software is loaded onto the devices under test so that the devices under test perform the determining of the measuring results without requiring the help of the measuring device. Such measuring software could in the example of mobile telephones be an android app or a IOS app or a Windows Phone app. The software can be uploaded to the device under test wirelessly or over a wired connection, for example USB.

Figure 6:
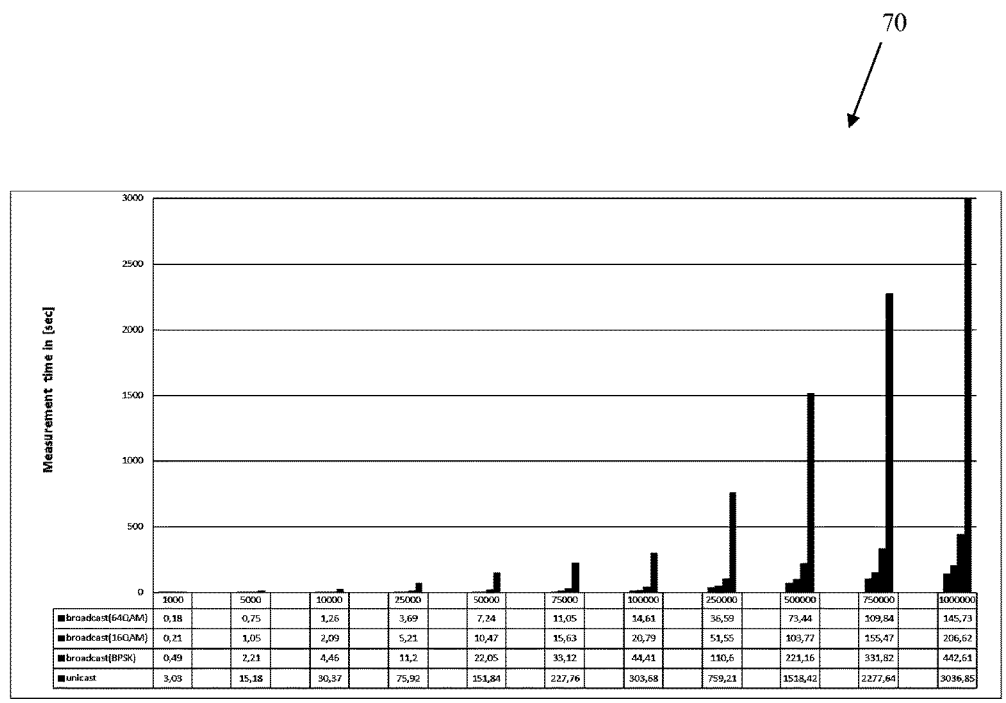
FIG. 6 shows measuring time results of different measuring systems.

In FIG. 6, a diagram 70 showing measuring times for different modulation schemes and packet numbers is shown. On the x-axis, the number of packets for the measurement is depicted, while on the y-axis the measurement time is shown. For each single packet number, four different measurement signal types are depicted. The left most signal is a 64QAM modulated broadcast signal. The second signal from the left is a 16QAM modulated broadcast signal. The third signal from the left is a BPSK modulated broadcast signal. The right most signal for each packet number is a unicast signal. It is obvious, that for low packet numbers, the time duration differences are not significant. For high packet numbers though using broadcast signals reduces the measurement type significantly.

Figure 7:
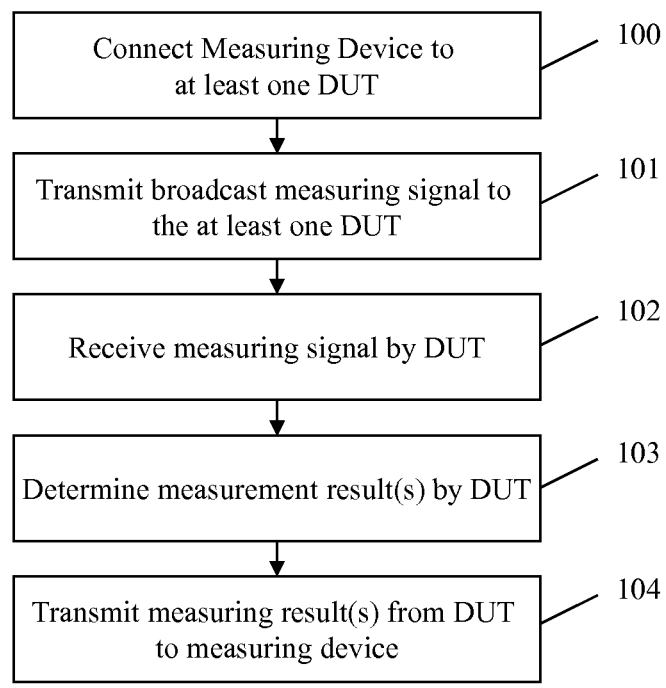
FIG. 7 shows an embodiment of the inventive measuring method in a flow diagram.

In FIG. 7, an embodiment of the inventive measuring method is shown. In a first step 100, a measuring device is connected to at least one device under test. This connection can be a wired connection and/or a wireless connection. In a second step 101, a broadcast signal is transmitted to the at least one device under test. The broadcast signal is an analog high frequency broadcast measuring signal. In a third step 102 the measuring signal is received by the device under test. In a fourth step 103, one or more measurement results are determined by the device under test from the received measuring signal. In a fifth step 104, the measuring result or results are transmitted from the device under test to the measuring device. Optionally, the measuring results are then displayed by the measuring device.

The embodiments of the present invention can be implemented by hardware, software, or any combination thereof. Various embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, or the like.

Various embodiments of the present invention may also be implemented in the form of software modules, processes, functions, or the like which perform the features or operations described above. Software code can be stored in a memory unit so that it can be executed by a processor. The memory unit may be located inside or outside the processor and can communicate date with the processor through a variety of known means.

The invention is not limited to the examples and especially not to the specified communication standards. The invention discussed above can be applied to many communication standards, which are able to use broadcast signals. The characteristics of the exemplary embodiments can be used in any advantageous combination.

Although the present invention and its advantages have been described in detail, it should be understood, that various changes, substitutions and alterations can be made herein without departing from the spirit and scope of the invention as defined by the appended claims.

EXAMPLE CLAUSES

A. A measuring device comprising a transmission unit and a communication unit, wherein the transmission unit is adapted to transmit a measuring signal, being an analog high frequency broadcast signal to at least one device under test, and wherein the communication unit is adapted to directly receive at least one measuring result from the at least one device under test.

B. The measuring device according to paragraph A, wherein the transmission unit is adapted to transmit the measuring signal wirelessly or over a wired connection to the at least one device under test, and/or wherein the communication unit is adapted to receive the at least one measuring result from the at least one device under test wirelessly or over a wired connection.

C. The measuring device according to paragraph A, wherein the at least one measuring result comprises a packet error rate and/or a bit error rate and/or a signal-to-noise-ratio.

D. The measuring device according to paragraph A, wherein the measuring device is adapted to require no additional hardware for performing the measurement, and/or wherein the measuring device is adapted to transmit the measuring signal to the at least one device under test and to receive the at least one measuring result from the at least one device under test without assistance of any external control device.

E. The measuring device according to paragraph A, wherein the measuring device comprises a display unit adapted to display the at least one measuring result, and/or wherein the measuring device comprises a processing unit adapted to
  control the transmission unit, and/or
  control the communication unit, and/or
if the measuring device comprises a display unit,
  control the display unit.

F. The measuring device according to paragraph A, wherein the measuring signal is an LTE signal and the at least one device under test is an LTE device, or wherein the measuring signal is a WIMAX signal and the at least one device under test is a WIMAX device, or wherein the measuring signal is a WLAN signal and the at least one device under test is a WLAN device, or wherein the measuring signal is a UMTS signal and the at least one device under test is a UMTS device.

G. The measuring device according to paragraph A, wherein the transmission unit is adapted to transmit the measuring signal to a plurality of devices under test simultaneously, and wherein the communication unit is adapted to receive simultaneously from the plurality of devices under test each at least one measuring result.

H. A measuring system comprising a measuring device according to any of the paragraphs A to F and at least one device under test, wherein the at least one device under test comprises a reception unit adapted to receive the measuring signal, wherein the at least one device under test comprises a measuring result determining unit adapted to determine the at least one measuring result, and wherein the at least one device under test comprises a communication unit adapted to transmit the at least one measuring result to the measuring device.

I. A measuring system comprising a measuring device according to paragraph G and a plurality of devices under test, wherein the plurality of devices under test each comprise a reception unit adapted to receive the measuring signal, wherein the plurality of devices under test each comprises a measuring result determining unit adapted to determine the at least one measuring result, and wherein the plurality of devices under test each comprises a communication unit adapted to transmit the at least one measuring result to the measuring device.

J. The measuring system according to any of paragraphs H or I, wherein the device under test is adapted to run a measuring software, which is adapted
  to control the measuring result determining unit to determine the at least one measuring result, and/or
  to control the communication unit to transmit the at least one measuring result to the measuring device.

K. A measuring method comprising the following steps:
  transmitting an analog high frequency broadcast measuring signal to at least one device under test by a measuring device,
  receiving the measuring signal by the at least one device under test,
  determining at least one measuring result,
  transmitting the at least one measuring result directly to the measuring device, and
  receiving the at least one measuring result directly from the at least one device under test by the measuring device.

L. The measuring method according to paragraph K, wherein the measuring signal is transmitted wirelessly or over a wired connection to the at least one device under test, and/or wherein the at least one measuring result is transmitted wirelessly or over a wired connection to the measuring device by the at least one device under test.

M. The measuring method according to paragraph K, wherein the at least one measuring result comprises a packet error rate and/or a bit error rate and/or a signal-to-noise-ratio.

N. The measuring method according to paragraph K, wherein the method comprises displaying the at least one measuring result on a display unit of the measuring device.

O. The measuring method according to paragraph K, wherein the measuring signal is an LTE signal and the at least one device under test is an LTE device, or wherein the measuring signal is a WIMAX signal and the at least one device under test is a WIMAX device, or wherein the measuring signal is a WLAN signal and the at least one device under test is a WLAN device, or wherein the measuring signal is a UMTS signal and the at least one device under test is a UMTS device.

P. The measuring method according to paragraph K, wherein the method comprises
  simultaneously transmitting the measuring signal to a plurality of devices under test,
  receiving the measuring signal by the plurality of devices under test,
  determining at least one measuring result by comparing the received measuring signal with pre-stored information by each of the plurality of devices under test,
  transmitting the at least one measuring result to the measuring device each of the plurality of devices under test, and
  simultaneously receiving the at least one measuring result from the plurality of devices under test by the measuring device.

Q. Computer program with program code means for performing the following:

transmitting an analog high frequency broadcast measuring signal to at least one device under test by a measuring device, receiving the measuring signal by the at least one device under test, determining at least one measuring result, transmitting the at least one measuring result directly to the measuring device, and receiving the at least one measuring result directly from the at least one device under test by the measuring device.

What is claimed is:

1. A measuring device comprising a transmission unit and a communication unit,
    wherein the transmission unit is adapted to transmit a measuring signal, being an analog broadcast signal to a plurality of devices under test,
    wherein the communication unit is adapted to directly receive at a plurality of measuring results from each one of the plurality of devices under test,
    wherein the transmission unit is adapted to transmit the measuring signal over an exclusively wired connection to the at plurality of devices under test, and
    wherein the communication unit is adapted to wirelessly receive the at plurality of measuring results from the plurality of devices under test.

2. The measuring device according to claim 1,
    wherein the at least one of the plurality of measuring results comprises a packet error rate and/or a bit error rate and/or a signal-to-noise-ratio.

3. The measuring device according to claim 1,
    wherein the measuring device is adapted to require no additional hardware except for the plurality of devices under test performing a measurement, and/or
    wherein the measuring device is adapted to transmit the measuring signal to the plurality of devices under test and to receive the plurality of measuring results from the at plurality of devices under test without assistance of any external control device, except for the plurality of devices under test.

4. The measuring device according to claim 1,
    wherein the measuring device comprises a display unit adapted to display the plurality of measuring results, and
    wherein the measuring device comprises a processing unit adapted to control the display unit.

5. The measuring device according to claim 1,
    wherein the measuring signal is an LTE signal and the at plurality of devices under test are LTE devices, or
    wherein the measuring signal is a WIMAX signal and the at plurality of devices under test are WIMAX devices, or
    wherein the measuring signal is a WLAN signal and the at plurality of devices under test are WLAN devices, or
    wherein the measuring signal is a UMTS signal and the at plurality of devices under test are UMTS devices.

6. The measuring device according to claim 1,
    wherein the transmission unit is adapted to transmit the measuring signal to the plurality of devices under test simultaneously, and
    wherein the communication unit is adapted to wirelessly receive at the plurality of measuring results from each of the plurality of devices under test.

7. A measuring system comprising the measuring device according to claim 1 and the at plurality of devices under test,
    wherein each of the plurality of devices under test comprises a reception unit adapted to receive the measuring signal,
    wherein each of the at plurality of devices under test comprises a measuring result determining unit adapted to determine the at plurality of measuring results, and
    wherein each of the plurality of devices under test comprises a further communication unit adapted to transmit the plurality of measuring results to the measuring device.

8. A measuring system comprising the measuring device according to claim 6 and the plurality of devices under test,
    wherein the plurality of devices under test each comprise a reception unit adapted to receive the measuring signal,
    wherein each of the plurality of devices under test comprises a measuring result determining unit,
    wherein the measuring result determining unit of each of the plurality of devices under test is adapted to determine the at plurality of measuring results of the respective one of the plurality of the devices under test, and
    wherein each of the plurality of devices under test comprises a further communication unit,
    wherein the further communication unit of each of the plurality of devices under test is adapted to transmit the plurality of measuring results of the respective one of the plurality of devices under test.

9. The measuring system according to claim 7,
    wherein each of the plurality of devices under test are adapted to run a measuring software, which is adapted:
        to instruct the measuring result determining unit to determine the plurality of measuring results, and/or
        to instruct the communication unit to transmit the plurality of measuring results to the measuring device.

10. A measuring system comprising the measuring device according to claim 1 and at the plurality of devices under test,
    wherein each of the plurality of devices under test comprises a reception unit adapted to receive the measuring signal,
    wherein each of the plurality of devices under test comprises a measuring result determining unit adapted to determine a respective one of the plurality of measuring results, and
    wherein each of the plurality of devices under test comprises a further communication unit adapted to transmit the respective one of the plurality of measuring results to the measuring device.

11. A measuring system comprising the measuring device according to claim 2 and the plurality of devices under test,
    wherein each of the plurality of devices under test comprises a reception unit adapted to receive the measuring signal,
    wherein each of the plurality of devices under test comprises a measuring result determining unit adapted to determine a respective one of the plurality of measuring results, and
    wherein each of the plurality of devices under test comprises a further communication unit adapted to transmit the respective one of the plurality of measuring results to the measuring device.

12. A measuring system comprising the measuring device according to the claim 3 and the plurality of devices under test, wherein each of the plurality of devices under test comprises a reception unit adapted to receive the measuring signal,
wherein each of the plurality of devices under test comprises a measuring result determining unit adapted to determine a respective one of the plurality of measuring results, and
wherein each of the plurality of devices under test comprises a further communication unit adapted to transmit the respective one of the plurality of measuring results to the measuring device.

13. The measuring device according to claim 1,
wherein the measuring device comprises a processing unit adapted to control the transmission unit, and/or control the communication unit.

14. A measuring method comprising:
transmitting an analog broadcast measuring signal to a plurality of devices under test by a measuring device,
receiving the analog broadcast measuring signal by each of the plurality of devices under test,
determining at a plurality of measuring results,
transmitting the plurality of measuring results directly to the measuring device,
receiving the plurality of measuring results directly from each of the plurality of devices under test by the measuring device,
wherein the analog broadcast measuring signal is transmitted over an exclusively wired connection to the plurality of devices under test, and
wherein the plurality of measuring results are transmitted wirelessly to the measuring device by each of the plurality of devices under test.

15. The measuring method according to claim 14,
wherein the at least one of the plurality of measuring results comprises a packet error rate and/or a bit error rate and/or a signal-to-noise-ratio.

16. The measuring method according to claim 14,
wherein the method comprises displaying the plurality of measuring results on a display unit of the measuring device.

17. The measuring method according to claim 14,
wherein the analog broadcast measuring signal is an LTE signal and each of the plurality of devices under test is an LTE device, or
wherein the analog broadcast measuring signal is a WIMAX signal and each of the plurality of devices under test is a WIMAX device, or
wherein the analog broadcast measuring signal is a WLAN signal and each of the plurality of devices under test is a WLAN device, or
wherein the analog broadcast measuring signal is a UMTS signal and each of the plurality of devices under test is a UMTS device.

18. The measuring method according to claim 14,
wherein the method comprises
simultaneously transmitting the analog broadcast measuring signal to each of the plurality of devices under test,
receiving the analog broadcast measuring signal by the plurality of devices under test,
determining the plurality of measuring results by comparing the received analog broadcast measuring signal with pre-stored information by each of the plurality of devices under test,
transmitting, by each of the plurality of devices under test, the plurality of measuring results to the measuring device, and
simultaneously receiving, by the measuring device, the plurality of measuring results from each of the plurality of devices under test.

19. A computer-readable, non-transitory storage medium storing computer executable instructions that, when executed by one or more processors, configure the one or more processors to perform operations comprising:
causing transmission of an analog broadcast measuring signal to a plurality of devices under test by a measuring device,
detecting receipt of the analog broadcast measuring signal by each the plurality of devices under test,
determining a plurality of measuring results,
causing transmission of the plurality of measuring results directly to the measuring device, and
detecting receipt of the plurality of measuring results directly from each of the plurality of devices under test by the measuring device,
wherein the analog broadcast measuring signal is transmitted over an exclusively wired connection to each of the plurality of devices under test, and
wherein the plurality of measuring results are transmitted wirelessly to the measuring device by each of the plurality of devices under test.

* * * * *